Feb. 4, 1930.                W. A. McKAY ET AL                1,745,901
                           UNDERWATER LIGHTING UNIT
                           Filed Feb. 13, 1926        2 Sheets-Sheet 1
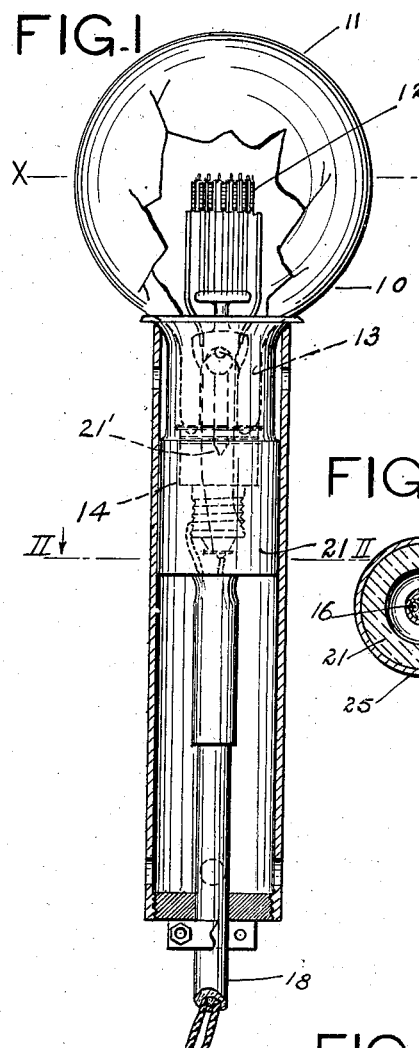
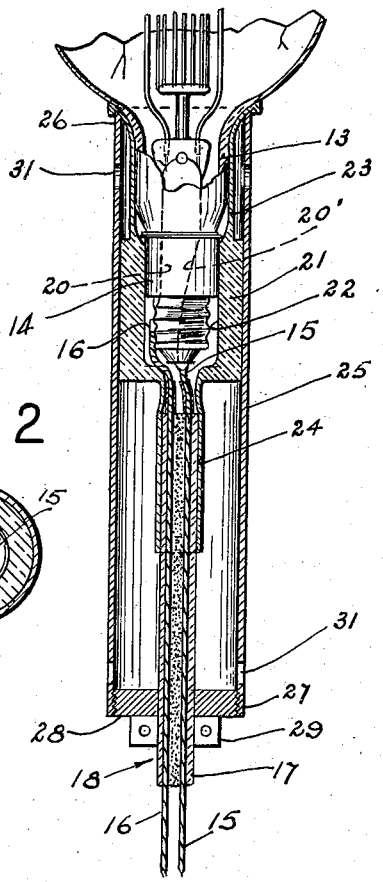
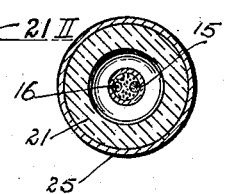
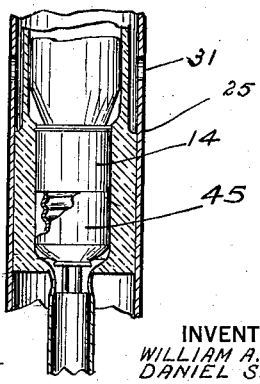
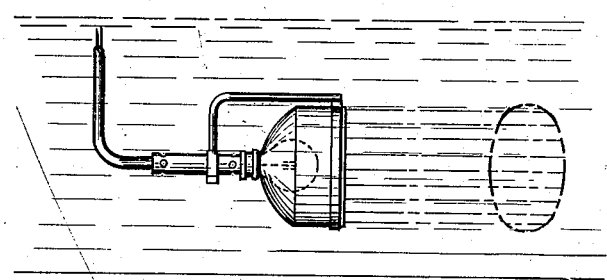
INVENTOR
WILLIAM A. McKAY
DANIEL S. GUSTIN
BY
ATTORNEY

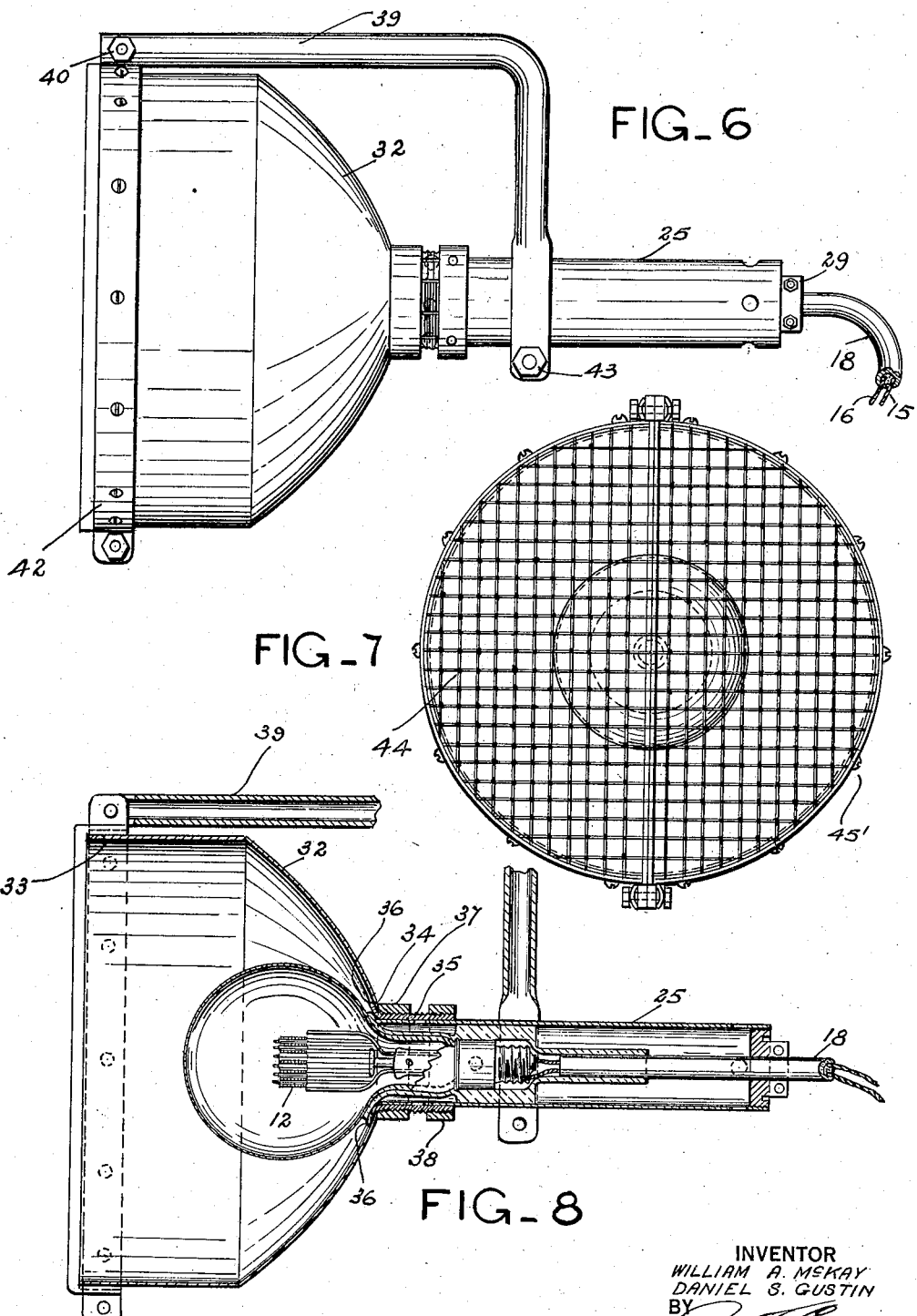

Patented Feb. 4, 1930

1,745,901

UNITED STATES PATENT OFFICE

WILLIAM AUGUSTINE McKAY, OF ESSEX FELLS, AND DANIEL SNYDER GUSTIN, OF EAST ORANGE, NEW JERSEY, ASSIGNORS TO WESTINGHOUSE LAMP COMPANY, A CORPORATION OF PENNSYLVANIA

UNDERWATER LIGHTING UNIT

Application filed February 13, 1926. Serial No. 88,044.

This invention relates to an under-water lighting unit and the method of producing under-water illumination.

An object of the invention is to provide a simple and compact under-water lighting unit.

Another object of the invention is to provide a means of illumination beneath the surface of the water by the provision of an incandescent electric lamp having the bulb immersed in direct contact with the water.

Another object of the invention is to provide an incandescent under-water lighting unit having the emitted light controlled.

Another object of the invention is to provide illumination beneath the surface of a body of water by a gas-filled incandescent lamp of the concentrated filament type, having the bulb of the lamp in direct contact with the water and a reflector for directing a beam of light from the filament.

A further object of the invention is to provide a method of under-water illumination by the immersion of a gas-filled incandescent electric lamp having the wall of the bulb of a thickness substantially the same as bulbs of the usual commercial lamps.

It is well known that divers have for many years labored under extreme difficulties and danger by reason of the absence of proper illumination while working beneath the surface of the water. Attempts have, of course, been made to provide the deep sea diver with the proper lighting facilities and divers were often equipped with battery operated lamps encased in pressure resisting containers. The degree of illumination possible by lamps of this type was, of course, limited and the life of the lamp was short. Further efforts were made to provide a greater amount of light and incandescent lamps of the vacuum type having electric energy supplied from a source above the surface of the water were put into operation.

The incandescent lamps used were necessarily of low wattage inasmuch as it was thought necessary to carefully protect them from direct contact with the water by elaborate fixtures of glass and metal. Usually these fixtures were so constructed that the light of the lamp was emitted in all directions around the side in order that all the possible illumination might be obtained. This general and uncontrolled emission of the light was to some extent a detriment to the diver in that the light reflected through the glass of his helmet and the direct glare somewhat hindered rather than helped his vision.

The great need was for more light, particularly more useful light, i. e., more light on the work, and, as in the use of a lighting unit under any conditions, the control of the light was also of vast importance.

In attempting to secure more light with the heavy type of fixture heretofore used by employing a lamp of over 100 or 200 watts, great difficulties were encountered. The fact that the bulb was enclosed resulted in the generation of heat to such an extent that even in these relatively small wattage lamps difficulty was experienced in avoiding the detrimental effects upon the fixture and especially upon the water-tight connections. It also followed that any increase in the wattage of the lamp would mean an increase in the size of the bulb with a consequent enlargement of the fixture so that when approaching 500 to 2,000 watts, the necessary housing would reach such proportions as to become absolutely impractical and beyond usefulness as a tool for manual handling.

Regarding the control of the beam of light, as for example by means of a reflector, this obviously was impossible from a practical standpoint with the fixtures heretofore employed, as is evident from the fact that if the proper proportioned reflector were used with a given wattage lamp, the added weight thereof together with the necessary size of the housing or fixture to accommodate the same would only go to increase the bulkiness of the device.

The small degree of illumination attained by one of the low wattage lamps, as heretofore employed, is exemplified by the fact that more than one of such lamps were used, it being the practice to use groups of three in order to attain any appreciable amount of light at the depths where they were used.

For many years divers have worked under adverse conditions by reason of the lack of proper under-water illumination and the need of not only more light but properly directed light was well recognized, which need was not satisfied until the event of the present invention.

In solving the problem and in removing all the above mentioned disadvantages, the applicants experimented with and found that a lamp known in the trade as the "C" type or coiled filament type gas-filled lamp could be operated in a highly efficient manner while submerged with the bulb thereof directly in contact with the water. A bulb of spherical shape was selected as having a construction capable of withstanding the water-pressure and it was found that a bulb of the usual commercial wall thickness would withstand pressures at depths of 300 feet or more. This was contrary to what any one had heretofore thought possible inasmuch as it was believed that a heavy casing was necessary and furthermore that a bulb of the concentrated filament type would develop a temperature so high as to cause cracking when placed in direct contact with a cold liquid. Although it was found possible to use a bulb of the same glass composition as that ordinarily used in the commercial type of lamp, a greater degree of success was obtained with a bulb composed of a glass having a relatively low coefficient of expansion. The glass used was that known in the lamp art as hard glass or pyrex (G.702.P). With a glass of this composition, high wattage lamps may be employed and the filament thereof may be lighted either before or after the lamp is submerged, or if desirable the lamp may be turned on and off while beneath the surface of the water without any disadvantage with respect to cracking due to too rapid expansion or contraction.

By reason of their new use of a gas-filled incandescent lamp, the applicants, in a measure, revolutionized under-water lighting conditions. Their complete elimination of any encasing or housing about the bulb not only resulted in the provision of an extremely simple and easily handled lighting fixture, but by placing the bulb of the lamp in direct contact with the water, it was found possible to provide illumination sufficient for a diver to have a range of vision of from 20 to 30 feet at depths of over 200 feet, as with lamps of 1000 watts, or of an even greater range of vision when using higher wattage lamps.

In addition to the increase in light, the use of the bulb in direct contact with the water made it convenient to employ a standard parabolic reflector so that a beam of light could be properly projected and the fixture handled in an effective and practical manner.

The under-water control of the beam of light is of relatively great importance since it enables a diver to illuminate the objects which may be of interest. The present invention, therefore, provides for a sufficient amount of light and furnishes means for concentrating and directing the light in a manner never heretofore possible in under-water illumination.

Owing to the cooling action of the water upon the bulb or sealed envelope of the lamp, it was found that the same could be made of a capacity appreciably less than was heretofore possible with lamps burned in the atmosphere. This reduction in the size of the bulb is obviously an advantage not only from an economical standpoint but by reason of the fact that it results in a reduction in the size of the unit.

Various other advantages are attained by reason of the present invention and the same will be hereinafter pointed out together with novel structural features more clearly understood by reference to the accompanying drawings in which:

Fig. 1 is a side elevational view of the present lamps partly in section without a reflector applied thereto.

Fig. 2 is a transverse sectional view taken on line II—II in Fig. 1.

Fig. 3 is a fragmentary view of the lamp shown in Fig. 1 partly in vertical cross-section.

Fig. 4 is a fragmentary view of a portion of a lamp similar to that shown in Fig. 1 and shows a cable with a socket to permit a removal of the lamp from the cable.

Fig. 5 is an elevational view showing the lamp with a reflector applied thereto.

Fig. 6 is an elevational view of the present invention and shows the lamp illustrated in Fig. 1 having a reflector and gripping handle mounted thereon.

Fig. 7 is a front view of the lighting unit shown in Fig. 6 looking toward the bulb projecting from the reflector and Fig. 8 is a longitudinal sectional view of the unit shown in Fig. 6.

As illustrated, the selected embodiment of the invention may comprise a lamp 10 having a glass bulb 11 of spherical form and of substantially the same thickness as that of the usual commercial lamp of this type. The size of the bulb, however, that is the distance of the diameter on line X—X, is appreciably less than a lamp of the same wattage when burned in the atmosphere. For example, a bulb for a 1000 watt lamp would have a diameter of 5 inches whereas the same wattage lamp used for under-water bulbs may have a diameter of 3¾ inches. The lamp as illustrated is provided with the usual concentrated or coiled type of filament 12. The neck 13 of the bulb being made somewhat longer than the ordinary lamp for purposes to be later described, although it has been found that bulbs with a neck of the ordinary length may be used successfully. If desirable the lamp employed may be unbased, but it has been found preferable to use the standard metallic base 14 and to secure a conductor 15 to the center contact thereof, and a conductor 16 to the side thereof by welding or soldering or any other suitable manner, thus connecting the conductors 15 and 16 with leading-in wire 20 and 20' of the bulb. Although the standard form of base is shown, it will be evident that the same is no more than a protective cover for the tipped off portion 21' of the bulb. This base or cover could of course be of any suitable shape and constitute a protective cap.

The conductors 15 and 16 may be embedded in a rubber or other suitable water-proof material 17 to constitute a cable 18 which serves as a conductor for supplying electrical energy to the filament from any suitable source, as a generator (not shown). For the purpose of excluding any water or other liquid, in which the lamp may be immersed, from contact with the connection or electrical conductors between the covering of the cable and the lamp, a flexible sleeve 21 is provided. This sleeve may be of any suitable elastic insulating material and it has been found preferable to use soft rubber. The sleeve may have any desirable shape and be adapted to closely engage with the neck of the bulb and with a portion of the cable adjacent to the lamp base. The sleeve shown in the drawing is of tubular form, having a thickened portion 22 intermediate relatively thin portions 23 and 24. The portion 24 is made to tightly fit the outer surface of the cable 18 and may be vulcanized thereto or securely cemented or bonded in any other suitable manner. The thickened portion 22 snugly fits the base or protective cover portion of the lamp and the portion 23 tightly engages the neck 13 of the bulb 11. The neck may be relatively long as shown to provide a long contact or bearing surface for the portion 23 of this sleeve. By means of this sleeve an enclosure is provided about the connection between the bulb and the cable, that is all electrical conductors which might come in contact with the liquid surrounding the lamp are enclosed in a water-tight enclosure. When the lamp is immersed in the water, the pressure thereof holds the sleeve 21 or enclosure firmly in contact with the bulb and other parts to be sealed against the water.

A lamp having a sleeve as above described applied thereto may be used as a unit to provide illumination beneath the surface of the water, but it is found desirable to provide means for controlling or directing the beam of light in a given direction as by the use of a reflector. For the purpose of mounting a reflector in operative relation to the bulb 11, a rigid casing 25 is provided to enclose the sleeve 21 and is so proportioned as to fit the enlarged portion 22 thereof. This casing when used in connection with lamps up to about a 1000 watt is disposed with an end 26 in contact with upper portion 23 of the sleeve 21. In higher wattage lamps, however, the casing entirely encloses the upper portion of the sleeve and the edge thereof is disposed in contact with the glass wall of the bulb, for the reason that in the higher wattage lamps the lower portion of the wall of the bulb, which is encased from the cooling action of the water, would reach a temperature sufficient to melt the rubber sleeve. The opposite end 27 of the casing 25 is provided with a screw plug 28 having a clamp 29 secured thereto by means of which the cable 18 may be clamped to the casing 25 and the same held in its proper position relative to the bulb. The casing 25 serves as a stiffening member between the cable and the bulb as well as a mount for a reflector.

The casing is provided with apertures 31 to permit the entrance of water for the cooling effect and the application of pressure against the sleeve 21. The casing 25 therefore provides a rigid shank or support-member for the bulb upon which may be mounted a reflector 32 of any suitable material which will provide a reflecting surface and resist the corrosive action of the water. The reflector may be of the parabolic type for the direction of parallel rays of a beam of light and having an extension 33. The reflector 32 may have an aperture 34 to receive a split externally threaded collar 35, which may have a flange 36 to engage the inner surface of the reflector. Casing 25 may be disposed in and have a slidable fit with the interior of the sleeve 35 and a clamping nut 37 is screwed on to the collar to hold the wall of the reflector against the flange 36. The reflector and collar may thus be adjusted upon the casing 25 until the filament 12 of the lamp is in the proper focal position. When in such position, a nut 38 having a slightly less pitch diameter than that of the collar 35 may be screwed thereon, the collar being slightly tapered in the usual manner, to clamp the same upon the casing 25, holding the reflector in the proper adjusted position.

The lamp with the reflector applied thereto thus provides a compact lighting unit which may be provided with a handle 39 secured by nut 40 to a band 42 secured to the periphery of the extension 32 of the reflector. The handle 39 may also be adjustably secured by a clamp 43 to the casing 25 so as to permit the casing to be adjusted. For the purpose of protecting the bulb from the impact of solid bodies, the open end of the reflector is provided with a suitable screen 44 of wire mesh held by the band 42, the band being secured by screws 45'.

The lamp as above described is permanently connected to the cable 18. A removable connection may, however, be employed as for example as shown in Fig. 4 in which the cable is provided with a socket 45 of usual type into which the base 14 may be screwed. It will be appreciated that where a socket or other removable connection is used, if a lamp should burn out the same may be removed by simply unscrewing from the socket and another replaced. If desirable, the casing 25 may be removed and the upper portion 23 of the sleeve may be stripped down to facilitate the removal of the lamp.

In assembling the various parts in the water-tight sleeve 21, it is found desirable to lubricate the parts well with a lubricant such as castor oil which not only facilitates the assembly of the parts in the sleeve but acts to some extent as a seal against the entrance of the water.

By the use of an incandescent lamp in which the bulb is directly in contact with the water the metallic or other relatively heavy structure of the unit may be of a weight only slightly greater than the buoyancy of the bulb, thus the use of the unit is more convenient for deep sea work. In lamps in which a bulb is encased in a water-tight compartment the casing is not only cumbersome, but in addition, a considerable amount of weight must be added to overcome the buoyancy resulting from the large capacity of the air-tight compartment. This, as will readily be appreciated, makes an enclosed lamp, as heretofore provided, wholly impractical, whereas the present unit may be handled with the same ease and efficiency as accompanies the use of the ordinary flash lamp found in every day service.

The importance of the present invention will be further recognized when it is appreciated that it is only possible for a diver to actively engage in his under-water work for a relatively short time interval and that the amount of work he may perform is to a large extent dependent upon the lighting facilities as well as the ease or convenience in handling the same. Heretofore with the heavy and cumbersome fixture which gave only a meager amount of light and the light being uncontrolled could not be directed to illuminate distant objects, considerable time was thus lost by the diver in groping from one place to another, whereas by reason of the present invention he is able to direct his energies in an efficient and time-saving manner.

Although a preferred embodiment of the invention is shown and described herein, it is to be understood that modifications may be made therein without departing from the spirit and scope of the present invention as set forth in the appended claims.

What is claimed is:

1. An under-water lighting unit comprising a bulb having a filament therein, a conductor for supplying electrical energy to said filament, connection between said conductor and said filament, an elastic sleeve surrounding said connection, a rigid casing surrounding said sleeve, said casing having apertures to permit water pressure against said elastic sleeve to hold the same in water-tight relation with said connection.

2. An under-water lighting unit comprising a bulb having a filament therein, a conductor for supplying electrical energy to said filament, connection between said conductor and said filament, an elastic sleeve surrounding said connection, a rigid casing surrounding said sleeve and provided with apertures to permit water pressure against said elastic sleeve to hold the same in water-tight relation with said connection, and a reflector mounted on said casing.

In testimony whereof, we have hereunto subscribed our names this 11th day of February 1926.

WILLIAM AUGUSTINE McKAY.
DANIEL SNYDER GUSTIN.